United States Patent [19]

Yoneyama

[11] Patent Number: 5,799,537
[45] Date of Patent: Sep. 1, 1998

[54] ADJUSTING MECHANISM FOR FINE CONTROL RATIO IN FINE CONTROL JOYSTICK

[75] Inventor: Shinji Yoneyama, Tokyo, Japan

[73] Assignee: Nanishige Co. Ltd., Tokyo, Japan

[21] Appl. No.: 698,403

[22] Filed: Aug. 15, 1996

[30] Foreign Application Priority Data

Aug. 17, 1995 [JP] Japan .................. 7-209693

[51] Int. Cl.$^6$ .................. B25J 13/02; G05G 9/00
[52] U.S. Cl. .................. 74/471 XY
[58] Field of Search .................. 74/471 XY

[56] References Cited

U.S. PATENT DOCUMENTS

| | | | |
|---|---|---|---|
| 4,526,169 | 7/1985 | Narishige et al. | 128/303 B |
| 4,607,919 | 8/1986 | Gartner et al. | 74/471 XY |
| 4,679,976 | 7/1987 | Narishige et al. | 74/471 XY |
| 4,700,584 | 10/1987 | Narishige et al. | 74/471 XY |
| 4,901,446 | 2/1990 | Narishige | 33/572 |

*Primary Examiner*—Allan D. Herrmann
*Attorney, Agent, or Firm*—Longacre & White

[57] ABSTRACT

An adjusting mechanism 41 of fine control ratio in a fine controlling joystick of the present invention offers an adjusting member 47 suspending a fixed ball 50 from a neck thereof and supporting slidably in a vertical direction in a displacement board 43, a movable ball 57 having a long groove 57a provided in a vertical direction at outer surface thereof and suspending an operation handle 60 outside and a cylindrical inner wall contacting the outer surface of the fixed ball, a movable ball holder 52 rotatively supported at a hole of larger diameter of a displacement board 45, rotatively supporting the movable ball 57 in the through hole of the cylinder and projecting an engagement pin 56 to engage into a long groove 57a of the movable ball 57, and transmitting arrangement 55, 61, and 64 to convert rotation of the movable ball holder 52 into fine vertical movement of the vertical direction displacement board 65. Three ways dimensional displacement in three coordinates fine control including displacement from horizontal plane to vertical direction can be performed by one operation handle by changing a distance between the center of the fixed ball 50 and the center of the movable ball 57.

3 Claims, 5 Drawing Sheets

ADJUSTING MECHANISM FOR FINE CONTROL RATIO IN FINE CONTROL JOYSTICK

BACKGROUND OF THE INVENTION

1. Field of the Invention

The present invention relates to an adjusting mechanism for fine control ratio in a micromanipulator when fine control actuation is carried out under microscope.

2. Prior Art

In the field of basic medical science or biotechnology, micromanipulators to treat cells in various manners such as retaining, suctioning, pouring, dividing, or the like for organ of creatures, cellular texture, egg cells, or the like have been offered. It has been considered very important to adequately control the cells in corresponding to an enlarged ratio when fine control actuation is carried out under microscope.

FIG. 3 is an instruction drawing to briefly explain composition of conventional cells treatment device.

In FIG. 3 the cells treatment device comprises a stage 3 to place a laboratory dish 2 thereon, the laboratory dish 2 including the egg cells 1 dipped in a reagent therein, a fixed retaining portion 4 to fixedly retain the cells 1, a micromanipulator to carry out practical treatment of the cells, and an optical system to observe images of the cells 1 by illuminating. All these parts are integrally formed and placed on a vibration-proof mat 7.

The micromanipulator 5 is provided with various kinds of micro tools 8 corresponding to respective use for cell treatment. Said micromanipulator is also provided at its foremost end with a three dimensional displacement mechanism. The three dimensional displacement mechanism is operated by means of hydraulic press or the like by actuating a joystick 9 by an operator.

The joystick 9 comprises an operation handle 12 vertically suspended from the foremost end part of a supporting frame 11 having visor shape and a transmitting part 14 to transmit a shaking motion 13 of two dimensional movement directions (indicated by arrow) crossing at a right angle relative to each other to the foregoing three dimensional displacement mechanism by means of hydraulic press or the like. The operator shakes the operation handle 12 to proceed fine control actuation in horizontal plane.

The operation handle 12 has a conversion part 15 to convert the shaking motion 13 of two directions (indicated by arrow) crossing at a right angle to a mechanical displacement in horizontal plane. The conversion part 15 is provided at connecting portion where the operation handle 12 connects the supporting frame 11.

In conventional devices there was a model to stand the operation handle 12 uprightly from the conversion part 15. However, the models to suspend the operation handle 12 downwardly are mostly used in the light of more easy handling.

There were also models to provide a fine control mechanism in vertical direction in the vicinity of the conversion part 15 to displace an object to be treated to vertical direction in the three dimensional displacement mechanism.

FIG. 4 is an illustration to explain a conversion part of joystick in FIG. 3.

In FIG. 4, the conversion part of joystick possesses a basic board (not shown) on which a Y-coordinate displacement board 22 is movably mounted in lengthwise direction with the aid of linear way bearings (not shown) on the basic board. On the other hand, there is mounted a X-coordinate displacement board 23 movably in widthwise direction with the aid of linear way bearings (not shown) at lower portion of the basic board.

A supporting member 25 to adjust displacement amount is screwed into a through hole of larger diameter of the X-coordinate displacement board movably in vertical direction. A flange 25a is provided at lower part of the supporting member 25. The flange 25a is notched on the periphery thereof. A curved surface 25b is provided at upper part of the inner surface of the cylinder of the supporting member 25. This curved surface 25b retains upper part of the movable ball 26 to protect said movable ball from escaping upwardly. A movable ball fixing member 27 is screwed into the inner wall at lower part of the cylinder of the supporting member 25 to retain the lower part of the movable ball 26.

The movable ball fixing member 27 presents approximately a cylindrical shape. The movable ball fixing member 27 has a through hole whose inner diameter is expanded downwardly. A flange 27a is provided at lower part of the cylinder of said movable ball fixing member 27. The flange 27a is notched on the periphery thereof. A curved surface 27b is provided at upper part of the inner surface of the cylinder of the movable ball fixing member 27. The curved surface 27b retains the lower part of the movable ball 26 to protect said movable ball 26 from escaping downwardly.

The periphery of a fixed ball 29 suspended from the Y-coordinate displacement board 22 comes in contact with the cylindrical inner wall pro-vided in the movable ball 26. The basic top end part of the operation handle 31 is screwed into the lower part of the cylindrical through hole of the movable ball 26.

Also, referential mark O indicates the center of the fixed ball 29 and referential mark C indicates the center of the movable ball 26 (center of the tilting operation of the operation handle 31). When O and C come to the same position, the movable ball 26 only rotates round the center O and there occurs no change of relations between the fixed ball 29 and the movable ball 26, and the X-coordinate displacement board 23 and the Y-coordinate displacement board 22, respectively.

However, if O and C are located with a certain distance, for instance, if the operation handle 31 is tilted toward X-coordinate (left and right) direction, the movable ball 26 itself moves round the center O together with the operation handle 31 because the fixed ball 29 is fixed in X-coordinate direction, and the X-coordinate displacement board 23 is smoothly displaced to the shaking direction against the center O.

On the other hand, if the operation handle 31 is tilted toward Y-coordinate (forward and backward) direction, the fixed ball 29 moves round the center C because the fixed ball 29 can move in Y-coordinate direction and the Y-coordinate displacement board 22 is smoothly displaced to the shaking direction against the center C.

By increasing or decreasing in screwing amount of the supporting member 25 to the X-coordinate displacement board 23 of the supporting member 25 as said movable ball fixing member 27 and the movable ball 26 are assembled in one unit, the fixed ball 29 moves upward and downward along the cylindrical inner wall 26a of the movable ball 26 to vary the center distance between the fixed ball 29 and the movable ball 26. The adjusting mechanism to adjust fine control ratio is thus constructed.

Accordingly, at first the movable ball 26 is inserted into the supporting member 25 to adjust displacing amount.

Next, the movable ball fixing member 27 is screwed into the lower part of the supporting member 25 to assemble them integrally. Finally, such assembled supporting member 25 is screwed into the X-coordinate displacement board 23.

Manufacture of the supporting member 25 takes time in precision cutting operation of screw on the periphery of the cylinder and in forming screw grooves on the periphery of the cylinder of larger diameter. Order of assembling these parts is also an important factor.

Adjusting operation is described hereunder:

For instance, it is required to select a rough fine control operation to confirm object and starting position of operation quickly in smaller enlarged ratio of microscope. Next, selection of a fine control operation with an enlarged ratio or the particular position is required to treat the cells.

Accordingly, an operator quickly adjusts fine controlling ratio of microscope and change of enlarging ratio of the same as rapidly as possible. He also operates the microscope in vertical direction and illuminating the object as well.

In other words, there is a fear that the operator may sometime displace the real position of the objects to be treated by displacing once fixed real position of the tilted operation handle 31 carelessly.

Sometimes it is required to previously screw in the movable ball fixing member 27 into the supporting member 25 to prevent the movable ball 26 from being moved not to displace the once decided position.

However, it has been pointed out the following problems when conventional adjusting mechanism with a fine control joystick is applied for the operation of micromanipulator or the like:

(1) An object to be treated is moved in two dimensional directions in the horizontal plane but it is not possible to displace it in three dimensional operation by only one operation handle. The three dimensional operation by one operation handle at a time is not existed.

(2) The supporting member which concurrently adjusts displacement amounts requires enough largeness and smoothness to hold the movable ball. A complicated screw cutting to engage the supporting member with the movable ball fixing member is also required. Thus manufacturing cost is naturally higher.

(3) Order of construction of the supporting member is limited owing to a relation between the movable ball and the movable ball fixing member. It is also difficult to carefully handle such large and heavy assembled unit and it causes an increase of manufacturing cost.

(4) When fine control ratio is adjusted, it is required to operate some instruments including microscope provided in the vicinity of the joystick together. During handling operation of the adjusting mechanism, the operator sometimes displaces the real position once decided by tilting the operation handle and the real position of the object to be treating due to his careless handling. These problems are pointed out to be improved.

SUMMARY OF THE INVENTION

The present invention has been made with the foregoing background in mind and its object resides in providing a simple and inexpensive but having various adaptability and operative adjusting mechanism in three dimensional controlling joystick.

The present invention comprises an adjusting member supported movably in vertical direction on one displacement board in two coordinates directions of a horizontal plane, suspending a fixed ball through a neck of the adjusting member, a movable ball which forms a cylindrical inner wall and suspends an operation handle outside, the cylindrical inner wall contacting to an outer surface of the fixed ball, said movable ball having a long groove excavated in vertical direction on outer surface thereof, a movable ball holder projecting an engagement pin to engage with the long groove of the movable ball, the movable holder rotatively supporting the movable ball in a through hole of the cylinder thereof, said movable ball holder being rotatively supported in a hole of larger diameter formed in vertical direction on one displacement board of two axes directions, a transmitting means to convert and transmit rotation of the movable ball holder into vertical direction, are provided and each of two ways displacement boards is finely moved by operation of an operation handle, the fixed ball is moved upward and downward along cylindrical inner wall of said movable ball by operation of adjusting member, adjusting fine control movement ratio by varying center distance between the fixed ball and the movable ball, rotating the movable ball holder by rotation of the operation handle and finely control displacement boards of vertical direction by rotation of the operation handle.

An adjusting mechanism of the fine controlling ratio in fine controlling joystick, wherein said fine controlling joystick finely controls a manipulator to manipulate objects for enlarged observation under microscope when the device is operated by manipulator to enlarge it.

An adjusting mechanism of the controlling ratio in fine controlling joystick may be made, wherein said adjustment member being screwed into a through hole provided in vertical direction on the displacement boards at mounting side of said fixed ball and having an operation handle to rotate above the opposite side of said fixed ball.

DESCRIPTION OF THE PREFERRED EMBODIMENTS

Figure 1:
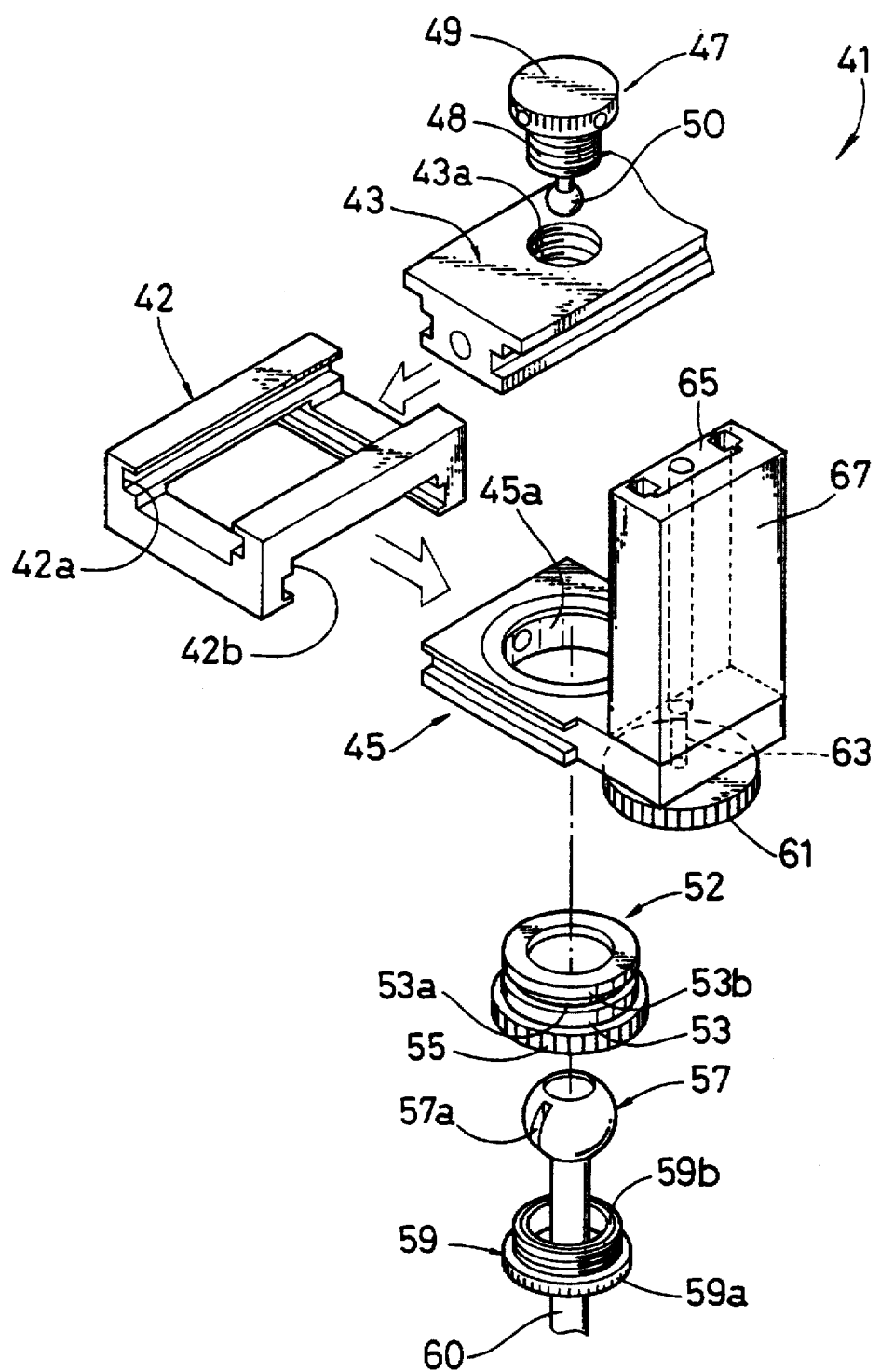
FIG. 1 is a front perspective view indicating disassembled fine adjusting mechanism of the joystick according to the present invention.
Figure 2:
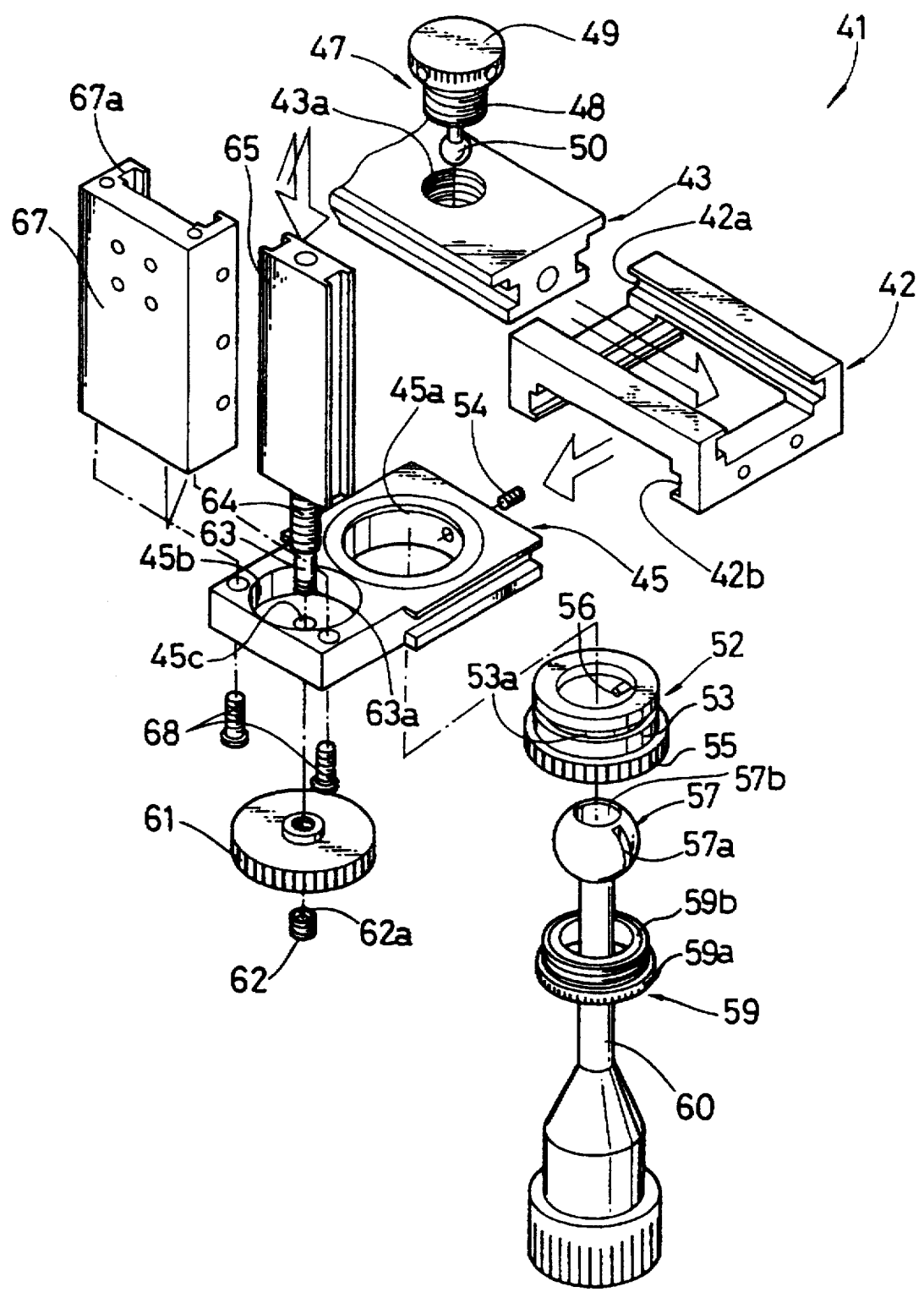
FIG. 2 is a rear perspective view indicating disassembled fine adjusting mechanism of the joystick according to the present invention.
Figure 3:
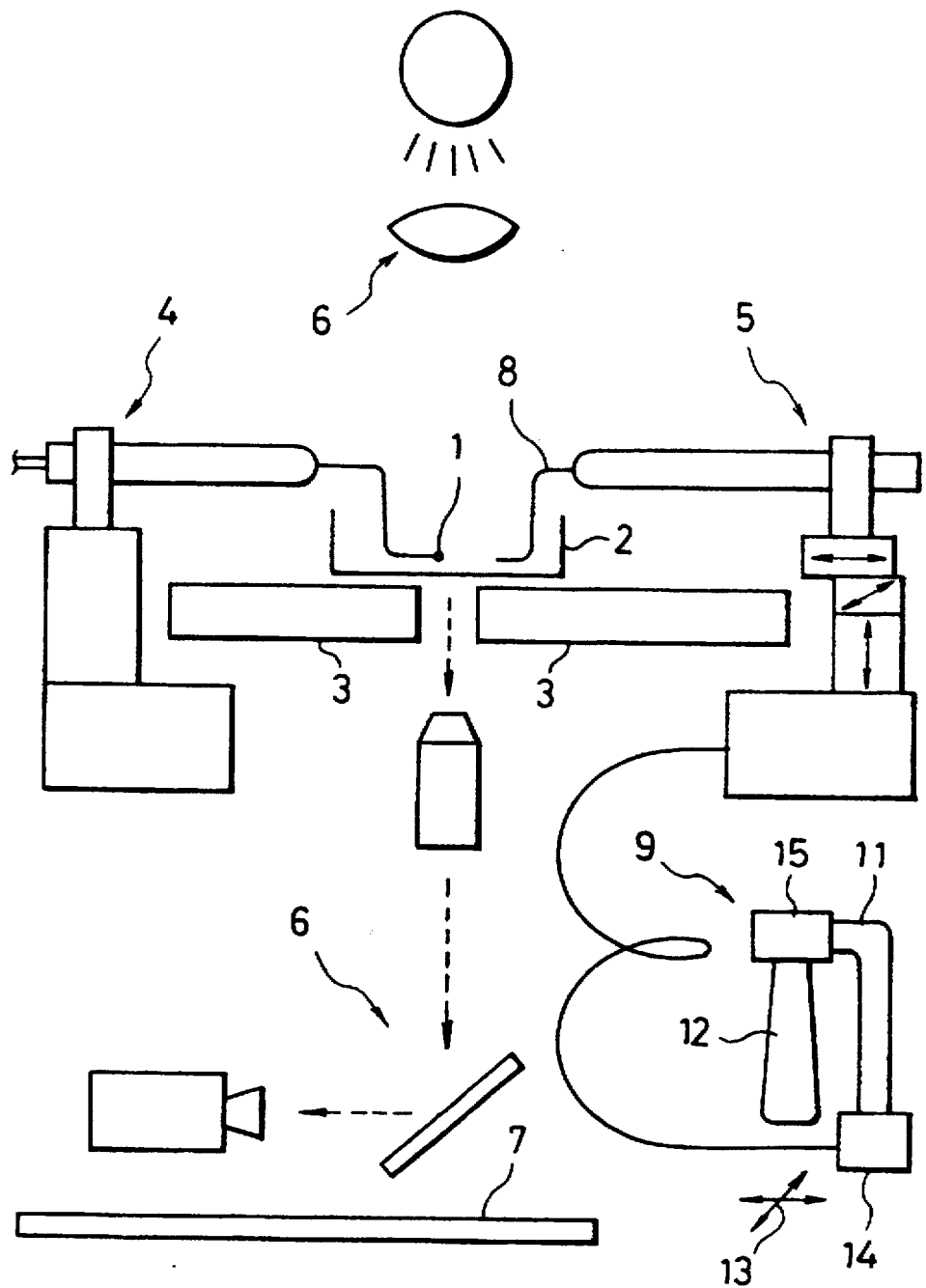
FIG. 3 is an illustration to briefly explain the conventional cells treatment device.
Figure 4:
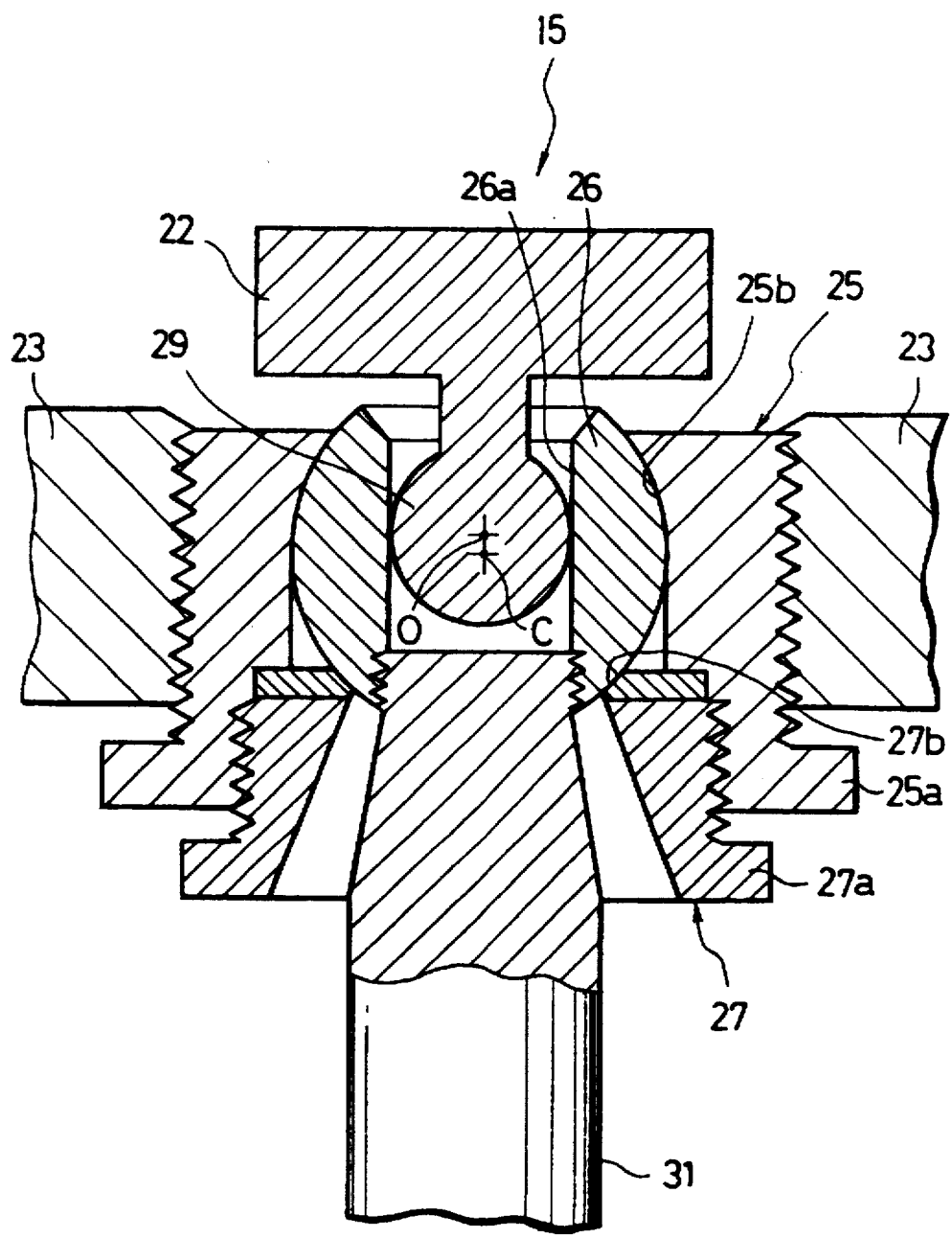
FIG. 4 is a side cross-section to illustrate composition of a conversion part of joystick of FIG. 3.
Figure 5:
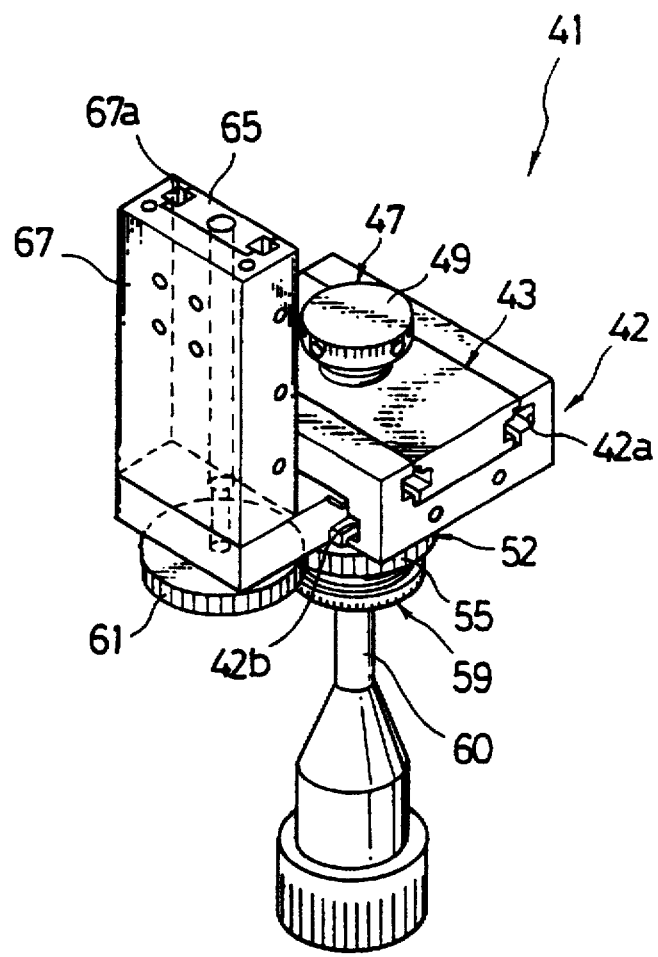
FIG. 5 is an isometric drawing showing all of the elements of FIG. 2 completely assembled.

The present invention is explained with reference to the accompanying drawings. FIG. 1 and 2 are perspective view indicating disassembled adjusting mechanism of fine control ratio of a fine controlling joystick according to the present invention.

In FIG. 1 and 2, a conversion part 41 of a joystick possesses a X-Y board 42. A Y-coordinate displacement board 43 is slidably mounted in lengthwise direction with the aid of linear way bearings (not shown) in a groove 42a provided in the X-Y board 42. On the other hand, a X-coordinate displacement board 45 is slidably mounted in widthwise direction with the aid of linear way bearings (not shown) in a groove 42b at lower part of the X-Y board 42.

An adjusting member 47 is screwed into a through hole 43a of the Y-coordinate displacement board 43. The adjusting member 47 comprises a screw 48 to be screwed into the through hole 43a of the Y-coordinate displacement board 43, a holding part 49 connected on an upper edge of the screw 48 to be rotated, the periphery of which is notched for easy handling and a fixed ball 50 suspended from the lowest end of the screw 48.

A cylindrical part of a movable ball holder or case 52 is rotatively fitted into the through hole 45a of larger diameter of said X-coordinate displacement board 45 and a setscrew 54 provided in the X-coordinate displacement board 45 contacts to a groove 53a provided on the periphery of said cylindrical part 53 to prevent the movable ball case 52 from being rotated.

A bending surface 53b is provided at upper part of the inner surface of the cylindrical part 53 of the movable ball case 52 to support upper part of said movable ball 57 and protect said movable ball from escaping upward. A movable ball fixing member 59 is screwed on the lower part of the inner surface of the cylinder part 53 to support the lower part of the movable ball 57 and a flange is provided at the foremost end of the cylinder 53 with a gear 55 provided on the periphery thereof. The movable ball case 52 comprises the cylinder 53 and the gear 55.

A pin 56 is projected substantially in the center of the inner surface of the cylinder 53 of the movable ball case 52. The pin 56 is engaged with a lengthwise groove 57a engraved in vertical direction at outer surface of the movable ball 57 and the pin 56 and the movable ball case 52 rotate by rotation of the movable ball 57. Said movable ball 57 is rotatively provided in vertical and horizontal directions along said pin 56.

Said movable ball fixing member 59 is almost cylindrical shape and it has a through hole whose inner surface is expanded downward. At lower end of the cylinder 53 there is provided a flange 59a whose periphery is notched. At upper end of the cylinder there is formed the bending surface 59b to retain the lower part of the movable ball and protect said movable ball from escaping downward.

A periphery surface of the fixed ball 50 suspended downward from the Y-coordinate displacement board 43 contacts a cylindrical inner wall 57b of a cylindrical through hole provided in the movable ball 57 and the top end of the operation handle 60 is screwed into the lower part of the cylindrical hole of the movable ball 57.

As shown in FIG. 2 a gear 61 is engaged with the gear 55 and an insert 62 having a inner screw 62a is buried in a boss of the gear 61.

A round concave groove 45b is provided in the X-coordinate displacement board 45 and a through hole 45c of smaller diameter is located in the center of the round concave groove 45b. A shaft 63 of smaller diameter is inserted through the through hole 45c and a screw 63a at the foremost end of the shaft 63 is screwed into the inner screw 62a of the insert 62. One end of a screw shaft 64 of larger diameter is fixedly provided at upper end of the shaft 63.

The lowest end of the screw shaft 64 of larger diameter contacts the bottom of the round concave groove 45b and the screw shaft 64 is prohibited from moving downward. A female screw of Z-coordinate displacement board 65 is fitted on the male screw shaft 64. The Z-coordinate displacement board 65 is mounted slidably in vertical direction along a groove 67a of a guide 67 through linear way bearings (not shown). The guide 67 is mounted upright on the X-coordinate displacement board 45 by means of bolts 68, 68.

The Z-coordinate displacement board 65 is slidable in vertical direction along the groove 67a of the guide 67 as the gear 61 rotates. When the Z-coordinate displacement board 65 is moved downward, the screw shaft 64 of larger diameter moves inside space of the round concave groove 45b till it contacts the bottom of said round concave groove 45b so that the Z-coordinate displacement board 65 may be prohibited from moving downward.

When the operation handle 60 is tilted toward the X-coordinate direction (left and right directions), the movable ball 57 rotates round the center O of the fixed ball 50 along with the operation handle 60 because the fixed ball is fixed in X-coordinate direction. The X-coordinate displacement board 45 is smoothly pushed away in the shaking direction against the center O. As the pin 56 is engageable within the scope of the lengthwise groove 57a of the movable ball 57, shaking operation of the movable ball 57 is performed without hindrance.

On the other hand, when the operation handle 60 is tilted toward Y-coordinate direction (forward and backward directions) the fixed ball 50 rotates round the center C of the movable ball 57 as the fixed ball 50 is movable in the Y-coordinate direction. The Y-coordinate displacement board 43 is smoothly pushed away in the shaking direction against the center C. As the pin 56 is engageable within the scope of the lengthwise groove 57a of the movable ball 57, shaking operation of the movable ball 57 is performed without hindrance.

When change of fine controlling ratio is required a holder 49 of the adjusting member 47 is rotated to displace the fixed ball 50 in the cylindrical hole of the movable ball 57 to adjust a positional relation between the center O of the fixed ball 50 and the center C of the movable ball 57. The nearer the center O and C approach, the fine controlling ratio becomes smaller. On the other hand, the further the center O and C are separated, the fine control ratio becomes larger.

Accordingly, controlling operation of fine control ratio is performed above the joystick where there are no substances to become obstacles. There will be no fear that the operator displaces the once fixed position by tilting the operation handle during his operation and so said once fixed position of the objects is kept safely.

Next, when the operation handle 60 is rotated, the movable ball 57 is also rotated. As the pin 56 of the movable ball case 52 is engaged with the lengthwise groove 57a of the movable ball 57, the movable ball case 52 rotates as the movable ball 57 rotates. Then the rotation of the operation handle is transmitted via a transmitting means to the shaft 63 and the screw shaft 64 through the gear 55 and 61. The Z-coordinate displacement board 65 moves vertically along the guide 67 as the screw shaft 64 rotates.

When a setscrew 54 is fastened, the setscrew 54 contacts the groove 53a of the movable ball case 52 to prevent the movable ball case 52 from rotating and the operation handle 60 is also prohibited from rotating. The Z-coordinate displacement board 65 is also prohibited displacing in vertical direction.

Accordingly, the two ways dimensional displacement is performed in horizontal plane and further displacement in vertical direction against the horizontal plane is performed by one operation handle.

In the foregoing example, the fixed ball is suspended from the Y-coordinate displacement board, it is of course admittable to suspend the fixed ball from the X-coordinate displacement board.

In the foregoing example, the adjusting member is screwed into the through hole of the Y-coordinate displacement board, it is of course possible to support the adjusting member in vertical direction by means of another preferable method.

While the present invention has been described above with respect to a preferred embodiment, it should of course be understood that it should not be limited only to this but various changes or modifications may be made in any acceptable manner without departure from the spirit and scope of the invention.

ADVANTAGES OF THE INVENTION (1) Mechanical construction of the conversion part is simplified. It can afford some space of mechanical construction. The three ways fine controlling operation from horizontal plane to vertical plane can be performed by one operation handle.

(2) The new fine controlling part becomes compact in comparison with conventional ones. No complicated mechanical processing is required. Thus manufacturing cost is decreased.

(3) As controlling operation can be proceeded in a space where no disturbing matter exists above joystick, there is no fear that operator will displace the once fixed position of the tilted operation handle and also the fixed position of the objects to be treated.

As instructed above, three coordinates fine controlling joystick is simple and cheap, and yet very operative. One operation handle offers very effective adjusting mechanism in three ways fine controlling joystick.

What is claimed is:

1. An adjusting mechanism of fine control ratio in fine controlling joystick comprising:

an adjusting member movably supported in vertical direction on one displacement board in two coordinate directions in a horizontal plane suspending a fixed ball through a neck of the adjusting member, a movable ball, a cylindrical inner wall of which is formed inside and the cylindrical inner wall is contacted with the outer surface of the fixed ball and the movable ball being provided with a long groove excavated on outer surface thereof in vertical direction, a movable ball holder protruding an engagement pin to engage with the long groove of the movable ball, the movable ball holder rotatively supporting the movable ball in a through hole of the cylinder, said movable ball holder being rotatively supported in a hole of larger diameter formed in vertical direction on another displacement board of said two coordinate directions, a transmitting means to convert and transmit rotation of the movable ball holder into vertical fine movement on a displacement board of vertical direction, are provided and each of said boards of two coordinate directions is finely moved by operation of an operation handle, the fixed ball is moved upward and downward along said cylindrical inner wall of said movable ball by operation of adjusting member, said adjusting fine control movement ratio by varying center distance between the fixed ball and the movable ball, rotating the movable ball holder by rotation of the operation handle and finely control displacement boards of vertical direction by rotation of the operation handle.

2. An adjusting mechanism of fine controlling ratio in fine controlling joystick according to claim 1, wherein said fine controlling joystick finely controls a manipulator to manipulate objects for enlarged observation under a microscope.

3. An adjusting mechanism of fine controlling ratio in fine controlling joystick according to claim 1, wherein said adjusting member being screwed into a through hole provided in vertical direction on the displacement boards at mounting side of said fixed ball and having a holding part to rotate above the opposite side of said fixed ball.

* * * * *